UNITED STATES PATENT OFFICE.

DANIEL MANSON SUTHERLAND, JR., OF TRENTON, NEW JERSEY, ASSIGNOR TO THE AGASOTE MILLBOARD CO., OF EWING TOWNSHIP, NEW JERSEY, A CORPORATION OF NEW JERSEY.

IMITATION WOOD.

1,153,970.      Specification of Letters Patent.      Patented Sept. 21, 1915.

No Drawing.      Application filed March 29, 1912. Serial No. 687,185.

*To all whom it may concern:*

Be it known that I, DANIEL MANSON SUTHERLAND, Jr., a subject of the King of England, and a resident of Trenton, New Jersey, have invented a certain new and useful Improvement in Imitation Wood, of which the following is a specification.

The object of my invention is to produce a sheet or shaped article of compressed fiber, such as paper, pulp, wood pulp, straw or the like, which has the appearance, strength, texture, and other qualities of natural wood.

My invention contemplates the production of a sheet of compressed fiber the fibers of which are impregnated with a substance well known in commerce as red gum. I am informed that this gum is obtained from the *Eucalyptus rostrata.*

The following example will illustrate the process which I employ for obtaining my product, although it should be understood that the process may be varied in many ways without departing from the spirit of my invention as stated in the appended claims: I first dissolve a suitable quantity of red gum in alcohol to a consistency suitable for the sheet to be impregnated. To this solution I may add boric acid if I desire to obtain a product with good fire resisting properties. The approximate proportions which I prefer to use are 8 parts, by weight, of red gum, 6 parts of alcohol, and 1 part of boric acid. Of course, I do not confine myself to these proportions which are given only as an example of a formula which I prefer to use. I then submit the board, (by which name the sheet of compressed fiber is known in the trade) to the action of a vacuum so as to avoid as much as possible any resistance to the entrance of the impregnating material. While the board is still under the action of the vacuum, it is submerged in the solution of red gum; air pressure is then applied so as to force the solution as completely as possible into all the pores and interstices of the board. The higher the pressure, the quicker and more complete will be the impregnation. I prefer to use the pressure of one hundred pounds to the square inch. The board is then removed from the solution and dried by hot air or in a vacuum drier. I prefer to employ a vacuum drier because the absence of air makes it easier to condense the alcohol vapors more efficiently. While it would be possible to carry on the drying process in the same chamber in which the board is impregnated, if the same were fitted with proper steam coils or plates and a suitable condenser, I prefer to carry out these two steps in separate chambers because the red gum would cake on the coils or plates and would necessitate their frequent removal for cleaning, and would prevent the proper radiation of heat. The alcohol may be recovered in the well known manner, and utilized for making fresh solution of red gum. While other solvents may be used for the red gum, I prefer alcohol as this is the only suitable substance known to me which will dissolve both the red gum and the boric acid, without interfering with the solubility of either, and at the same time be not too costly.

Sheets or shaped articles of compressed fiber properly impregnated with red gum, with or without the addition of boric acid, are water-proof and have the properties and appearance of natural wood to a marked degree. They have approximately the same specific gravity, tensile and compression strength, and rigidity as wood; they can be sawed, planed and sanded by ordinary woodworking tools, and will take the same finish as wood when treated with French polishes, varnishes and similar substances. They have this advantage over natural wood that long continued soaking in water will not cause them to soften, crack, warp or split; that they are waterproof, and if properly treated with boric acid, fireproof; and that, after impregnation, and before drying, they can be molded into a large variety of shapes with the greatest ease, and will retain such shapes after drying.

I claim:

1. As a new article of manufacture, compressed fiber impregnated with red gum, substantially as and for the purpose described.

2. As a new article of manufacture, compressed fiber impregnated with red gum and boric acid, substantially as and for the purpose described.

In witness whereof I have hereunto set my hand in the presence of two subscribing witnesses.

DANIEL MANSON SUTHERLAND, Jr.

Witnesses:
 JOHN A. KEHLENBECK,
 LOUIS ALEXANDER.